United States Patent
Lee et al.

(10) Patent No.: US 10,063,679 B2
(45) Date of Patent: Aug. 28, 2018

(54) MOBILE TERMINAL AND INCOMING SCREEN DISPLAY METHOD THEREOF

(71) Applicant: LG ELECTRONICS INC., Seoul (KR)

(72) Inventors: Junghoon Lee, Seoul (KR); Choonsik Lee, Seoul (KR); Hoon Jo, Anyang (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/634,238

(22) Filed: Jun. 27, 2017

(65) Prior Publication Data
US 2017/0295271 A1   Oct. 12, 2017

Related U.S. Application Data

(63) Continuation of application No. 14/455,430, filed on Aug. 8, 2014, now Pat. No. 9,723,141, which is a continuation of application No. 12/839,768, filed on Jul. 20, 2010, now Pat. No. 8,838,157.

(30) Foreign Application Priority Data

Nov. 19, 2009   (KR) .................. 10-2009-0112215

(51) Int. Cl.
*H04M 3/42*   (2006.01)
*H04M 1/57*   (2006.01)

(52) U.S. Cl.
CPC .......... *H04M 1/576* (2013.01); *H04M 1/575* (2013.01); *H04M 3/42178* (2013.01); *H04M 3/42374* (2013.01); *H04M 2201/38* (2013.01)

(58) Field of Classification Search
CPC .............................. H04M 1/576; H04M 1/575
USPC ......................................... 455/415, 566, 567
See application file for complete search history.

(56) References Cited

U.S. PATENT DOCUMENTS

| 8,160,554 B2 | 4/2012 | Gosselin et al. |
| 2006/0230355 A1 | 10/2006 | Nurmi |
| 2007/0116227 A1* | 5/2007 | Vitenson ............. H04M 3/4878 379/207.02 |

(Continued)

FOREIGN PATENT DOCUMENTS

| CN | 1716820 | 1/2006 |
| JP | 2002-312227 | 10/2002 |

(Continued)

OTHER PUBLICATIONS

Chinese Office Action dated Mar. 5, 2013 for Application 201010546454.0 and English translation.

(Continued)

*Primary Examiner* — Chuck Huynh
(74) *Attorney, Agent, or Firm* — KED & Associates LLP

(57) ABSTRACT

Disclosed are a mobile terminal, and an incoming screen display method thereof. The mobile terminal comprises: a communication unit configured to perform a communication with a transmitting terminal and/or a community server; and a controller configured to download a sender's content by requesting search for the sender's content from the community server when a call request is received from the transmitting terminal, and configured to display the downloaded content.

19 Claims, 17 Drawing Sheets

(56) References Cited

U.S. PATENT DOCUMENTS

| | | | | |
|---|---|---|---|---|
| 2007/0127515 | A1* | 6/2007 | Ben-Arie | H04L 12/42 370/429 |
| 2008/0152097 | A1* | 6/2008 | Kent | H04L 12/66 379/93.01 |
| 2008/0189292 | A1 | 8/2008 | Stremel et al. | |
| 2008/0261569 | A1 | 10/2008 | Britt | |
| 2009/0136013 | A1 | 5/2009 | Kuykendall et al. | |

FOREIGN PATENT DOCUMENTS

| | | |
|---|---|---|
| KR | 10-2005-0075500 | 7/2005 |
| KR | 10-2007-0056759 | 6/2007 |

OTHER PUBLICATIONS

European Search Report issued in related foreign application No. 10006694.3 dated Jun. 30, 2014.
U.S. Office Action dated Oct. 1, 2012 for U.S. Appl. No. 12/839,768 (now U.S. Pat. No. 8,838,157).
U.S. Office Action dated Apr. 30, 2013 for U.S. Appl. No. 12/839,768 (now U.S. Pat. No. 8,838,157).
U.S. Office Action dated Sep. 20, 2013 for U.S. Appl. No. 12/839,768 (now U.S. Pat. No. 8,838,157).
U.S. Notice of Allowance dated May 12, 2014 for U.S. Appl. No. 12/839,768 (now U.S. Pat. No. 8,838,157).
U.S. Office Action dated Jul. 15, 2015 for parent U.S. Appl. No. 14/455,430.
Korean Office Action dated Nov. 4, 2015 issued in Korean Application No. 10-2009-0112215.
U.S. Office Action dated Feb. 8, 2016 for parent U.S. Appl. No. 14/455,430.
U.S. Office Action dated Jun. 27, 2016 for parent U.S. Appl. No. 14/455,430.
U.S. Office Action dated Dec. 15, 2016 parent U.S. Appl. No. 14/455,430.
U.S. Notice of Allowance dated Mar. 28, 2017 for parent U.S. Appl. No. 14/455,430.

* cited by examiner

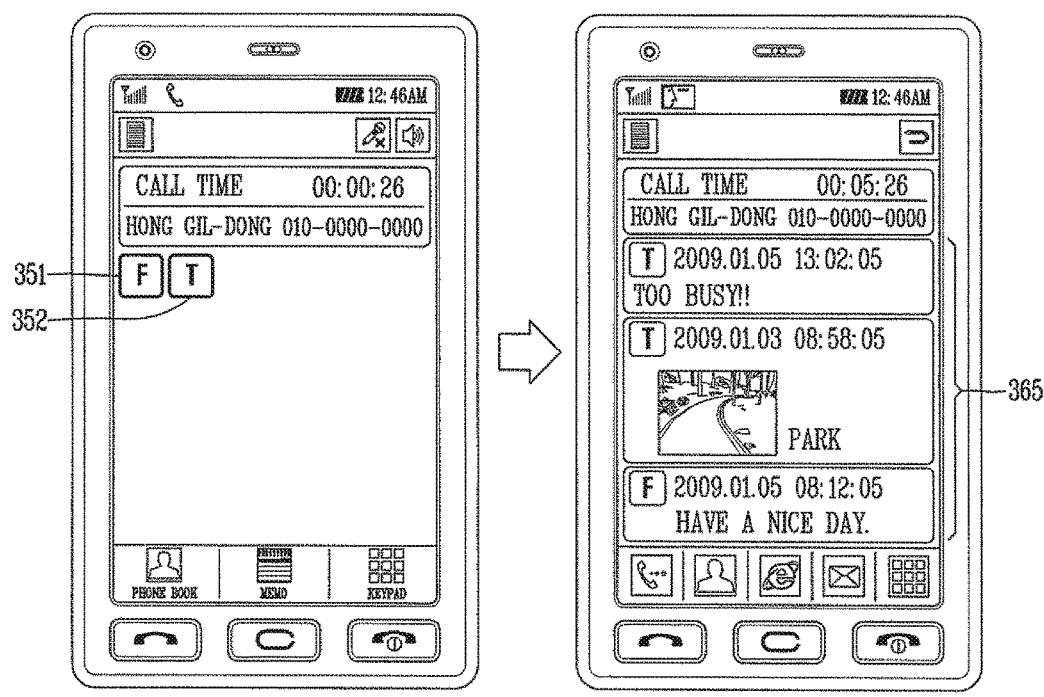

(a)

(b)

(c)

(a)          (b)

MOBILE TERMINAL AND INCOMING SCREEN DISPLAY METHOD THEREOF

CROSS-REFERENCE TO A RELATED APPLICATION

This application is a Continuation application of U.S. patent application Ser. No. 14/455,430 filed Aug. 8, 2014, which is a Continuation application of U.S. patent application Ser. No. 12/839,768 filed Jul. 20, 2010, which claims the benefit of earlier filing date and right of priority under 35 U.S.C. § 119 to Korean Application 10-2009-0112215, filed on Nov. 19, 2009, the content of which is incorporated by reference herein in its entirety.

FIELD OF THE INVENTION

The present invention relates to a mobile terminal, and particularly, to a mobile terminal capable of displaying an incoming screen by interworking with a social network service (SNS), and an incoming screen display method thereof.

BACKGROUND OF THE INVENTION

As terminals, such as computers, laptop computers, mobile phones and the like, become multifunctional, the terminals can be allowed to capture still images or moving images, play music or video files, play games, receive broadcast and the like, so as to be implemented as an integrated multimedia player.

In general, terminals may be divided into a mobile terminal and a stationary terminal according to each mobility. The mobile terminal may then be categorized into a handheld terminal and a vehicle mounted terminal according to whether a user can carry it around.

Structure and/or software improvement of the terminals may be considered in order to support and enhance the functions of the terminals.

Recently, a social network service (SNS) for sharing information with a plurality of undesignated users on the Internet is being much used. Accordingly, efforts are ongoing so as to provide a service interworking with a community service.

SUMMARY OF THE INVENTION

Therefore, an object of the present invention is to provide a mobile terminal capable of downloading content written by a sender from a community site and displaying the downloaded content when performing a call connection by interworking with a community site, and an incoming screen display method thereof.

Therefore, another object of the present invention is to provide a mobile terminal capable of downloading content registered to a sender's community site and displaying the downloaded content when performing a call connection by interworking with a community site, and an incoming screen display method thereof.

To achieve these and other advantages and in accordance with the purpose of the present invention, as embodied and broadly described herein, there is provided a mobile terminal, comprising: a communication unit configured to perform a communication with a transmitting terminal and/or a community server; and a controller configured to download a sender's content by requesting search for the sender's content from the community server when a call request is received from the transmitting terminal, and configured to display the downloaded content.

To achieve these and other advantages and in accordance with the purpose of the present invention, as embodied and broadly described herein, there is also provided an incoming screen display method of a mobile terminal, the method comprising: receiving a call request from a transmitting terminal; connecting to a community server upon receipt of the call request; requesting search for content registered by a sender from the community server; downloading the searched content from the community server; and displaying the downloaded content.

According to another aspect of the present invention, there is provided an incoming screen display method of a mobile terminal, the method comprising: receiving a call request from a transmitting terminal; searching for a sender's phone number from a phone directory upon receipt of the call request; connecting to the sender's community server based on information about the searched call party; requesting a predetermined number of contents registered to the sender's community site; downloading the requested predetermined number of contents; and displaying the downloaded predetermined number of contents.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 7A and 7B are examples of a screen of a mobile terminal according to one embodiment of the present invention, which show a method for downloading and displaying community information during a call;

DETAILED DESCRIPTION OF THE INVENTION

Description will now be given in detail of the present invention, with reference to the accompanying drawings. For the sake of brief description with reference to the drawings, the same or equivalent components will be provided with the same reference numbers, and description thereof will not be repeated.

Hereinafter, a mobile terminal according to the present invention will be explained in more detail with reference to the attached drawings. The suffixes attached to components of the mobile terminal, such as 'module' and 'unit or portion' were used for facilitation of the detailed description of the present invention. Therefore, the suffixes do not have different meanings from each other.

Mobile terminals described in the present invention may include mobile phones, smart phones, laptop computers, digital broadcasting terminals, personal digital assistants (PDAs), portable multimedia players (PMPs), navigators, and the like. However, it can be easily understood by those skilled in the art that the configuration in accordance with the preferred embodiment of the present invention may be applicable to stationary terminals, such as digital TVs, desktop computers and the like, excluding a case of being applicable only to the mobile terminals.

Figure 1:
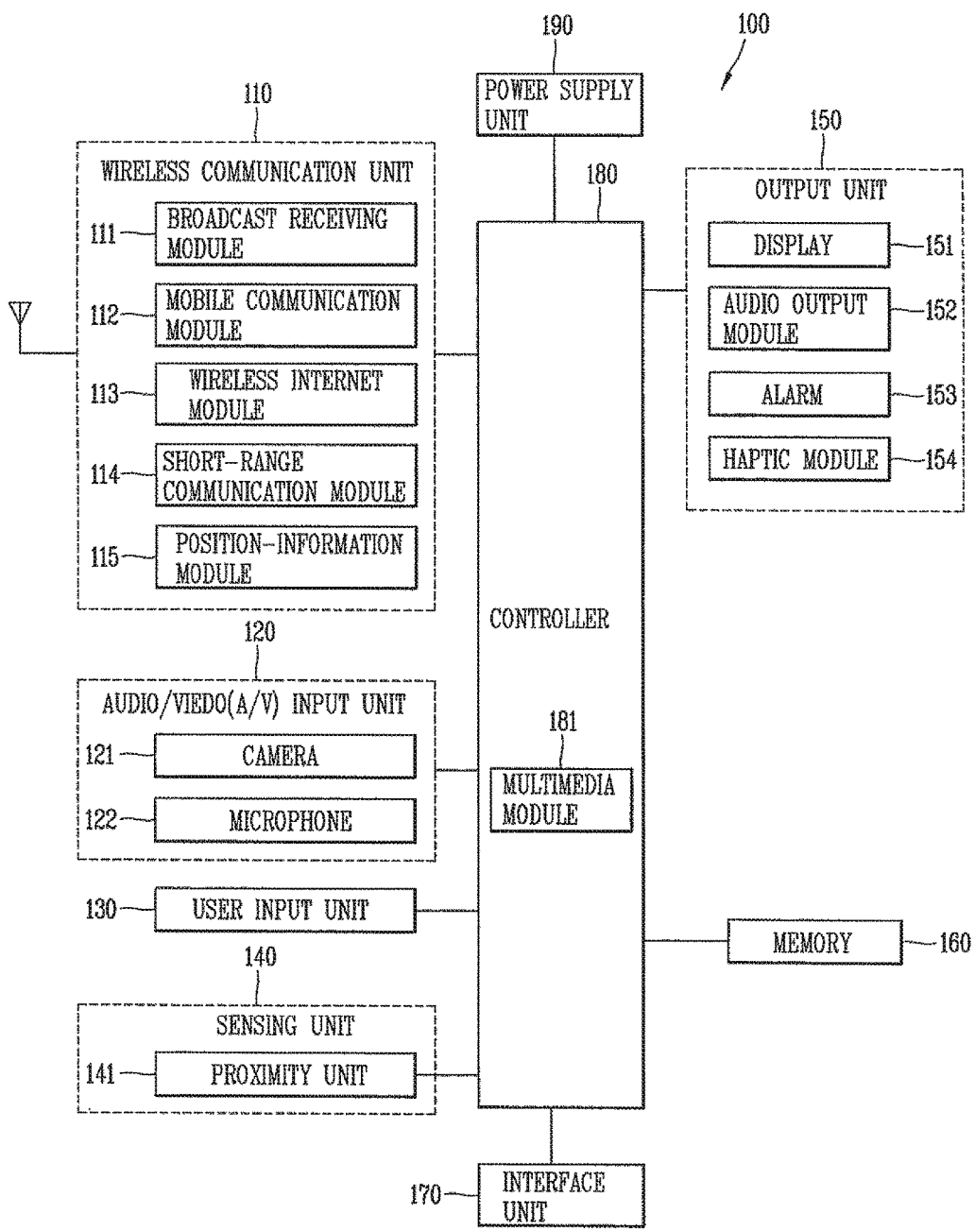
FIG. 1 is a block diagram of a mobile terminal in accordance with one embodiment of the present invention.

FIG. 1 is a block diagram of a mobile terminal in accordance with one embodiment of the present invention.

The mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may indicate information relating to broadcast channels, broadcast programs or broadcast service providers. Further, the broadcast associated information may be provided via a mobile communication network and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for detecting or calculating a position of a mobile terminal. An example of the position information module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video (telephony) call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the use environment of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the orientation of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device and the like. Moreover, the sensing unit 140 may include a proximity sensor 141.

The output unit 150 is configured to output an audio signal, a video signal or an alarm signal. The output unit 150 may include a display 151, an audio output module 152, an alarm 153, a haptic module 154 and the like.

The display 151 may output information processed in the mobile terminal 100. For example, when the mobile terminal is operating in a phone call mode, the display 151 will provide a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI.

The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of the displays can be configured to be transparent such that it is possible to see the exterior therethrough. These displays may be called transparent displays. A representative example of the transparent display may include a Transparent Organic Light Emitting Diode (TOLED), and the like. The rear surface of the display 151 may also be implemented to be optically transparent. Under this configuration, a user can view an object positioned at a rear side of a terminal body through a region occupied by the display 151 of the terminal body.

The display 151 may be implemented in two or more in number according to a configured aspect of the mobile terminal 100. For instance, a plurality of the displays 151 may be arranged on one surface to be spaced apart from or integrated with each other, or may be arranged on different surfaces.

Here, if the display 151 and a touch sensitive sensor (referred to as a 'touch sensor') have a layered structure therebetween, the structure may be referred to as 'touch screen'. In this structure, the display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display 151 has been touched.

As shown in FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display 151 or the audio output unit 152, the display 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various haptic effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 stores a phone book (phone directory) including information about one or more call parties. The information about call parties may include names, phone numbers, homepage addresses, community site information, anniversaries, addresses, etc. The community site information may include addresses of community sites being currently used by the call parties, IDs, passwords, etc.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2A:
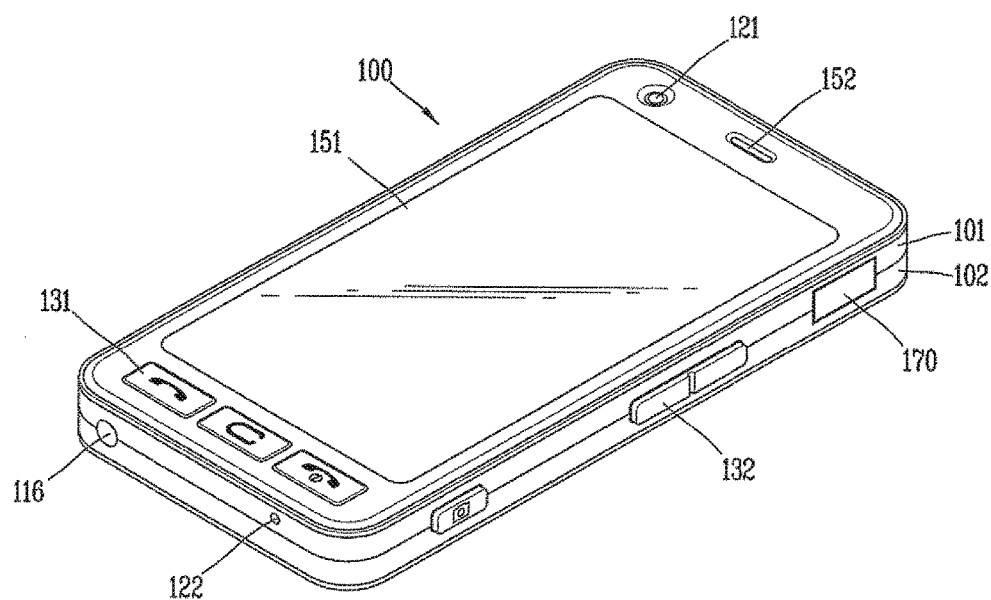
FIG. 2A is a front perspective view of the mobile terminal in accordance with the one embodiment of the present invention.

FIG. 2A is a front perspective views of the mobile terminal in accordance with the one embodiment of the present invention.

The mobile terminal 100 described is a bar type body. However, the present invention is not limited to the type, but applicable to various configurations having two or more bodies to each other to be relatively movable, such as a slide type, a folder type, a swing type, a swivel type and the like.

A case (casing, housing, cover, etc.) forming an outer appearance of a terminal body. In this embodiment, the case may include a front case 101 and a rear case 102. A space formed by the front case 101 and the rear case 102 may accommodate various components therein. At least one intermediate case may further be disposed between the front case 101 and the rear case 102.

Such cases may be formed of injection-molded synthetic resin, or may be formed using a metallic material such as stainless steel (STS) or titanium (Ti).

The terminal body, in detail, the front case 101 is shown having a display 151, an audio output module 152, a camera 121, a user input unit 130 (e.g., 131, 132), a microphone 122, an interface unit 170 and the like.

The display 151 may occupy most of a main surface of the front case 101. The audio output module 152 and the camera 121 are disposed at a region adjacent to one of both end portions of the display 151, and the user input unit 131 and the microphone 122 are disposed at a region adjacent to another end portion thereof. The user input unit 132, the interface unit 170 and the like may be disposed at side surfaces of the front case 101 and the rear case 102.

The user input unit 130 may be manipulated to receive a command input for controlling the operation of the mobile terminal 100, and include the first and second manipulation units 131 and 132. The first and second manipulation units 131 and 132 may be referred to as a manipulating portion. The manipulating portion may be operated by a user in any tactile manner.

Content input by the first and second manipulation units 131 and 132 may variously be set. For example, the first manipulation unit 131 may be configured to input commands such as START, END, SCROLL or the like, and the second manipulation unit 132 may be configured to input a command, such as adjusting an audio sound, a conversion of the display 151 into a touch-sensitive mode or the like.

Figure 2B:
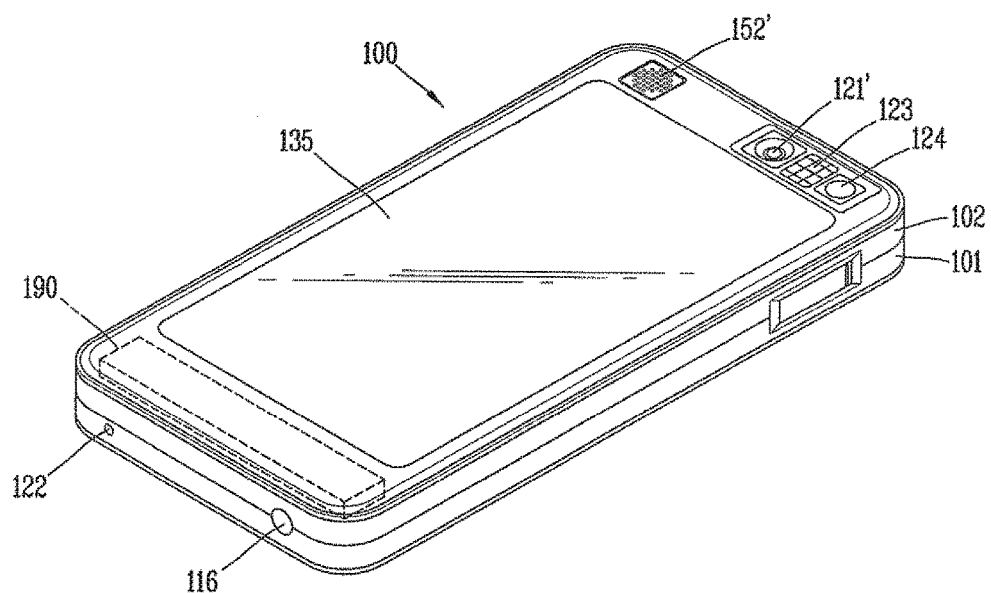
FIG. 2B is a rear perspective view of the mobile terminal in accordance with the one embodiment of the present invention.

FIG. 2B is a rear perspective view of the mobile terminal shown in FIG. 2A.

As shown in FIG. 2B, a rear surface of the terminal body, namely, the rear case 102 may further be provided with a camera 121'. The camera 121' faces a direction which is opposite to a direction faced by the camera 121, and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. Such cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output module 152' may further be disposed at a rear surface of the terminal body. The audio output module 152' can cooperate with the audio output module 152 (see FIG. 2A) to provide stereo output. Also, the audio output module 152' may be configured to operate as a speakerphone.

A broadcast signal receiving antenna 116 may further be disposed at the side surface of the terminal body in addition to an antenna for communications. The antenna 116 configuring a part of the broadcast receiving module 111 (see FIG. 1) may be retractable into the terminal body.

A power supply unit 190 for supplying power to the mobile terminal 100 may be mounted to the terminal body. The power supply 190 may be internally disposed at the terminal body, or be detachably disposed outside the terminal body.

A touch pad 135 for detecting a touch input may further be disposed at the rear case 102. The touch pad 135 may also be configured to be transparent, as similar to the display 151. In this case, if the display 151 is configured to output visible information on its both surfaces, such visible information can be identified via the touch pad 135. Information output on the both surfaces may all be controlled by the touch pad 135. Unlike to this, a display may further be mounted on the touch pad 135 so as to dispose a touch screen even at the rear case 102.

The touch pad 135 operates in cooperation with the display 151 of the front case 101. The touch pad 135 may be disposed at the rear side of the display 151 in parallel. Such touch pad 135 may be the same as or smaller than the display 151.

Hereinafter, description will be given of a cooperative operating mechanism between the display 151 and the touch pad 135 with reference to FIG. 3.

Figure 3:
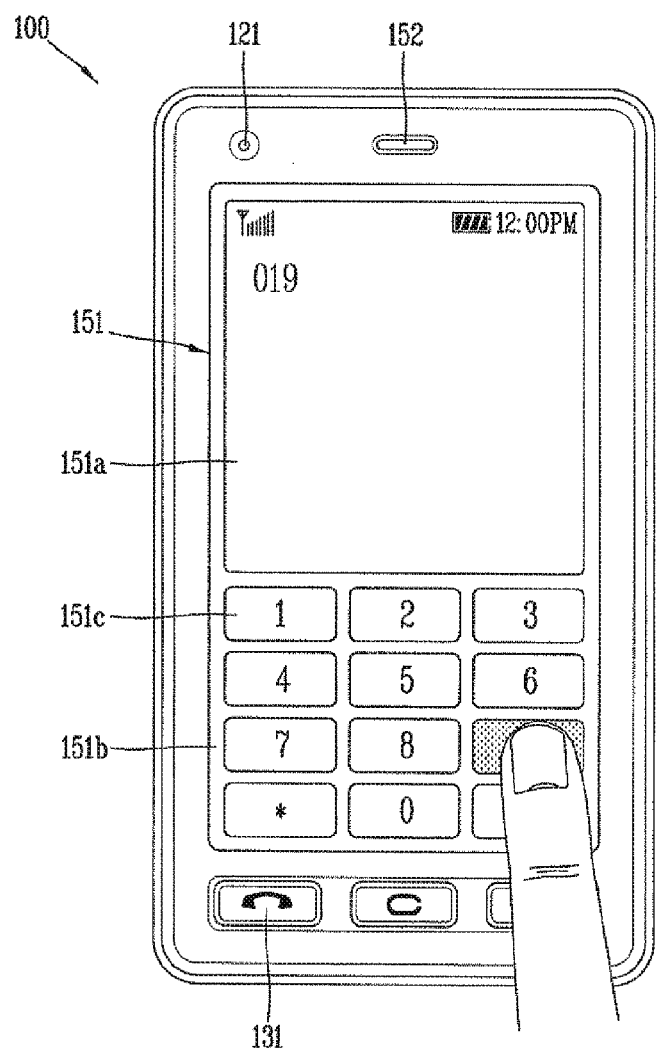
FIG. 3 is a front view of the mobile terminal for showing an operating state of the mobile terminal according to the present invention.

FIG. 3 is a front view of the mobile terminal for showing an operating state of the mobile terminal according to the present invention.

Various types of visible information may be displayed on the display 151. Such information may be displayed in several forms, such as character, number, symbol, graphic, icon or the like.

For input of the information, at least one of characters, numbers, graphics or icons may be arranged and displayed in a preset configuration, thus being implemented in the form of a keypad. Such keypad may be called 'soft key.'

FIG. 3 illustrates a touch input applied on a soft key through a front surface of the terminal body.

The display 151 may be operated as a single entire region or by being divided into a plurality of regions. For the latter, the plurality of regions may cooperate with one another.

For example, an output window 151a and an input window 151b may be displayed at upper and lower portions of the display 151, respectively. The output window 151a and the input window 151b are regions assigned for output or input of information. Soft keys 151c representing numbers for inputting telephone numbers or the like may be output on the input window 151b. When a soft key 151c is touched, a number or the like corresponding to the touched soft key 151c is output on the output window 151a. Upon manipulating the first manipulation unit 131, a call connection for a telephone number displayed on the output window 151a is attempted.

The embodiment exemplarily illustrates a touch input applied to the soft key through the front surface of the terminal body. Alternatively, for a terminal having a transparent display, another configuration may be implemented by allowing a touch input applied to a soft key through a rear surface of the terminal body.

Also, another configuration may be implemented such that if a terminal, which has been placed in a portrait direction as shown in FIG. 3, is relocated into a landscape direction, the terminal is allowed to change an output screen displayed on the display 151 according to the placed direction of the terminal itself.

The mobile terminal 100 shown in FIGS. 1 to 3 may be configured to be operated in a communication system including wired/wireless communication systems and a satellite-based communication system where data can be transferred through frames or packets.

Hereinafter, communication systems where the mobile terminal according to the present invention can be operable will be explained with reference to FIG. 4.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
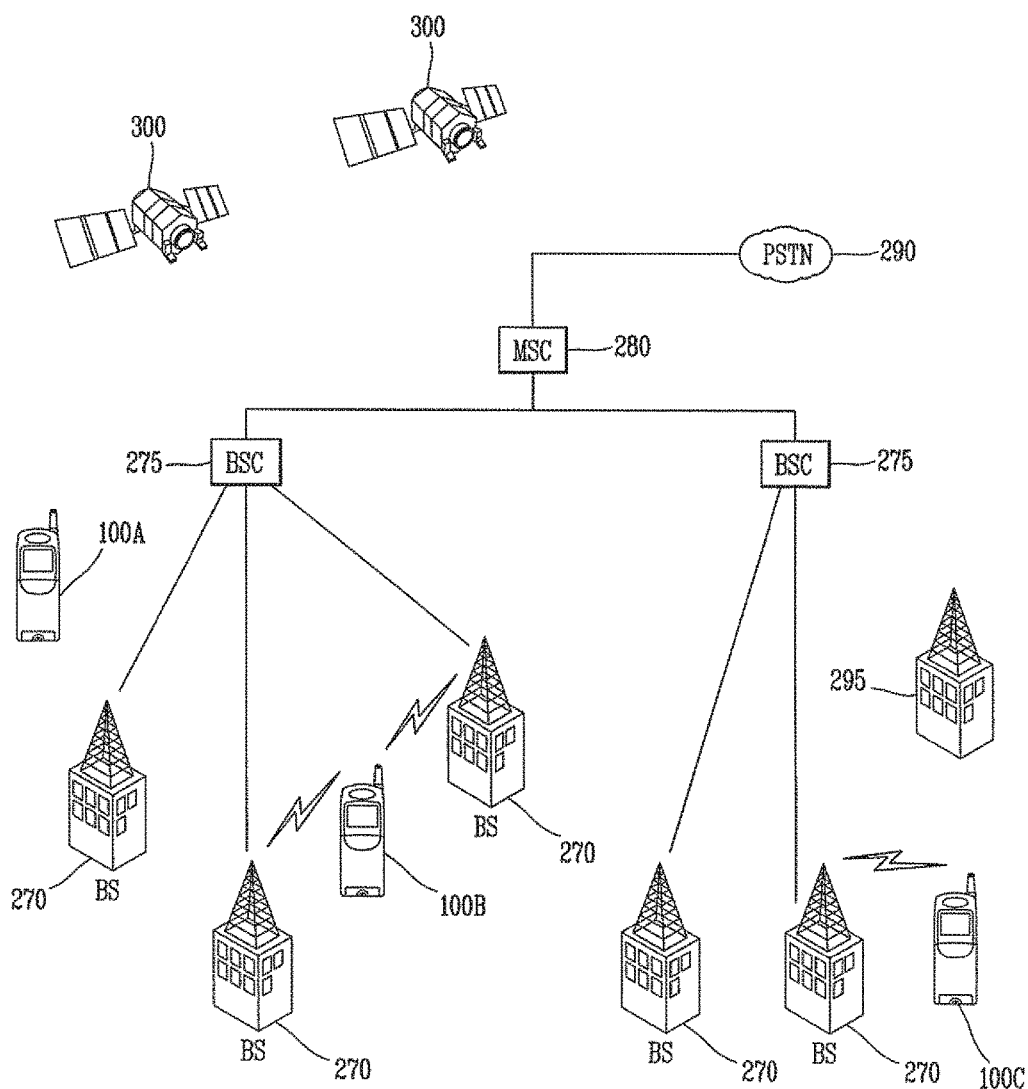
FIG. 4 is a block diagram showing a wireless communication system where a mobile terminal according to the present invention can be operated.

As shown in FIG. 4, a CDMA wireless communication system may comprise a plurality of mobile terminals 100A to 100C, a plurality of base stations 270, a plurality of base station controllers (BSCs) 275, and a mobile switching center (MSC) 280. The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omni-directional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100A to 100C. In FIG. 4, two satellites are shown, but positioning information may be obtained with greater or fewer satellites. In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100A to 100C. The mobile terminals 100A to 100C engage in calls, messaging, and other communications. In addition, each reverse-link signal received by a given base station 270 is processed within that base station 270, and the resulting data is forwarded to an associated BSC 275. The BSC 275 provides call resource allocation and mobility management functionality including soft handoffs between the base stations 270. Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100A to 100C.

Hereinafter, will be explained a call establishment (call connection) process between mobile terminals. It is assumed that one mobile terminal (transmitting terminal) connects a call to another mobile terminal (receiving terminal). However, one transmitting terminal may connect a call to a plurality of receiving terminals.

If a sender inputs (dials) a recipient's phone number by manipulating the user input unit 130 of a transmitting terminal 100A, the controller 180 of the transmitting terminal 100A displays, on the display (screen), data corresponding to the signal input through the user input unit 130. If the sender inputs a call key of the user input unit 130 after completing the input of the recipient's phone number, the controller 180 of the transmitting terminal 100A transmits a call request message through the wireless communication unit 110. The call request message includes a Mobile Identification Number (MIN), an Electronic Serial Number (ESN), a dialed digit of the transmitting terminal, etc. The call request message transmitted from the transmitting terminal 100A is received by the MSC 280 via the base stations 270 and the BSCs 275. Then, the MSC 280 checks a recipient's phone number included in the received call request message, and transmits a paging channel message to a corresponding receiving terminal 100B. The paging channel message includes system information, channel information, an authentication request, etc.

The receiving terminal 100B checks whether there is a call paging message transmitted thereto through periodic searches through the wireless communication unit 110. If the receiving terminal 100B receives a paging channel message, a paging channel response message to the base stations 270. The paging channel response message includes a Mobile Identification Number (MIN, phone number), an Electronic Serial Number (ESN, device number).

Next, the base stations 270 relays, to the MSC 280, the paging channel response message received from the receiving terminal 100B. After receiving the paging channel response message, the MSC 280 selects idle voice channels inside the base stations 270. Then, the MSC 280 transmits information about the selected channels to the base stations 270 through data lines. And, the base stations 270 transmit the received information to the receiving terminal 100B through control channels.

The receiving terminal 100B transmits a supervisory audio tone to the base stations 270, and the base stations 270 transmits the supervisory audio tone and a ring back tone to the transmitting terminal 100A. The supervisory audio tone is an audible frequency for monitoring a status of a voice path of a voice channel.

The base stations 270 transmits, to the receiving terminal 100B, an alert order message through a voice channel. The alert order message includes simple information such as a sender's phone number and name.

The receiving terminal 100B having received the alert order message outputs alerts (vibration, bell, lamp, silence, etc.) preset by a user.

If the recipient inputs a call key while the receiving terminal 100B outputs an alert informing a call signal reception according to the alert order message, the receiving terminal 100B transmits a connect order message to the base stations 270 thus to form a voice path.

Through these procedures, the transmitting terminal 100A and the receiving terminal 100B perform conversations through traffic channels.

With reference to FIG. 5, will be explained a method for downloading and displaying a sender's content registered to a recipient's social network service (SNS), by connecting to a server which provides a preset SNS when receiving a call signal by the mobile terminal.

The SNS provides a community service for sharing information with a plurality of undesignated parties, and making good connection with each other online. This community service is generally a web-based service, and includes social networking websites such as Me2Day, Cyworld, Facebook, MySpace, Twitter, Bebo, Orkut, linkedIn, Nexopia.

Figure 5A:
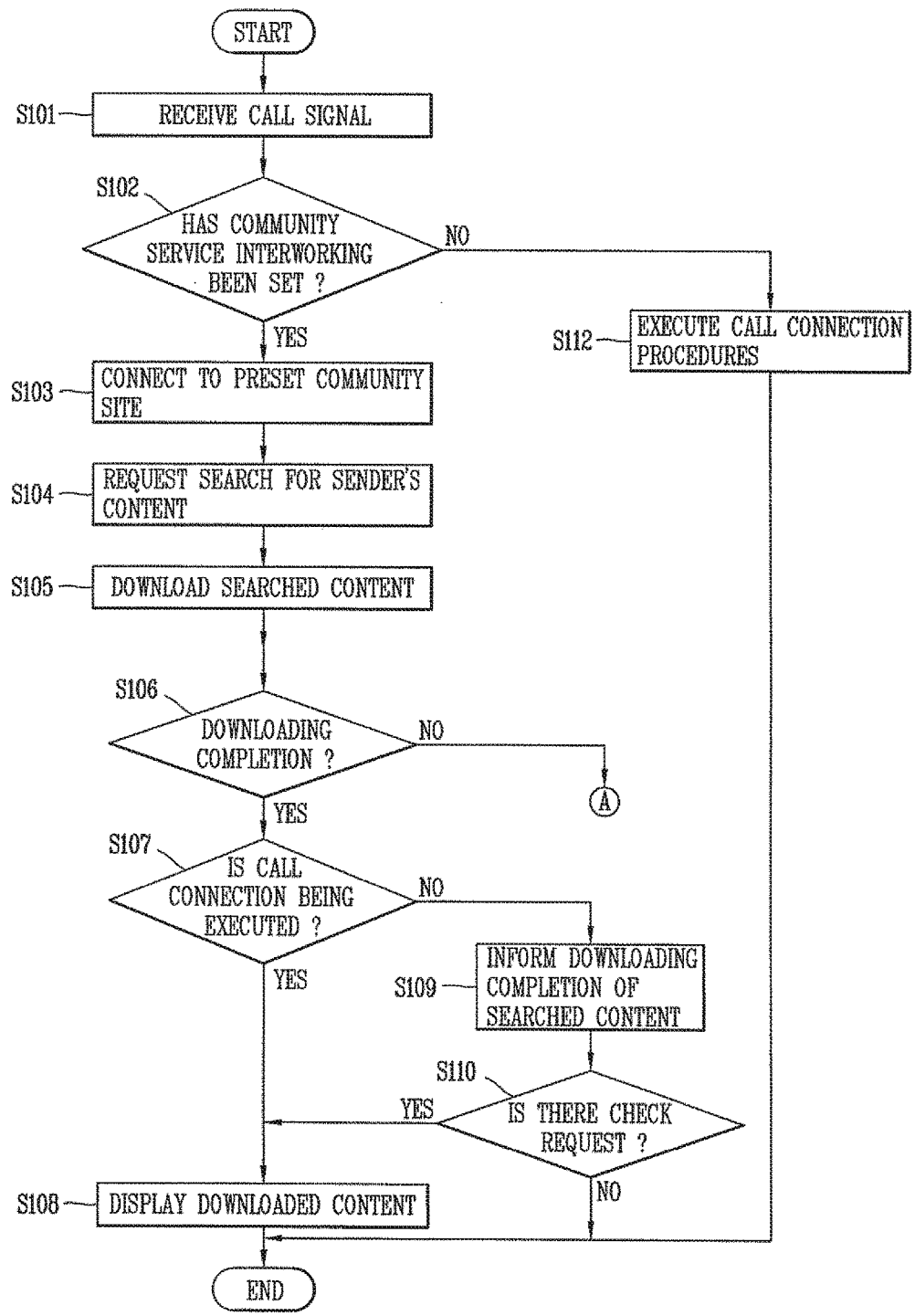
FIGS. 5A and 5B are flowcharts showing an incoming screen display method of a mobile terminal according to one embodiment of the present invention.
Figure 5B:
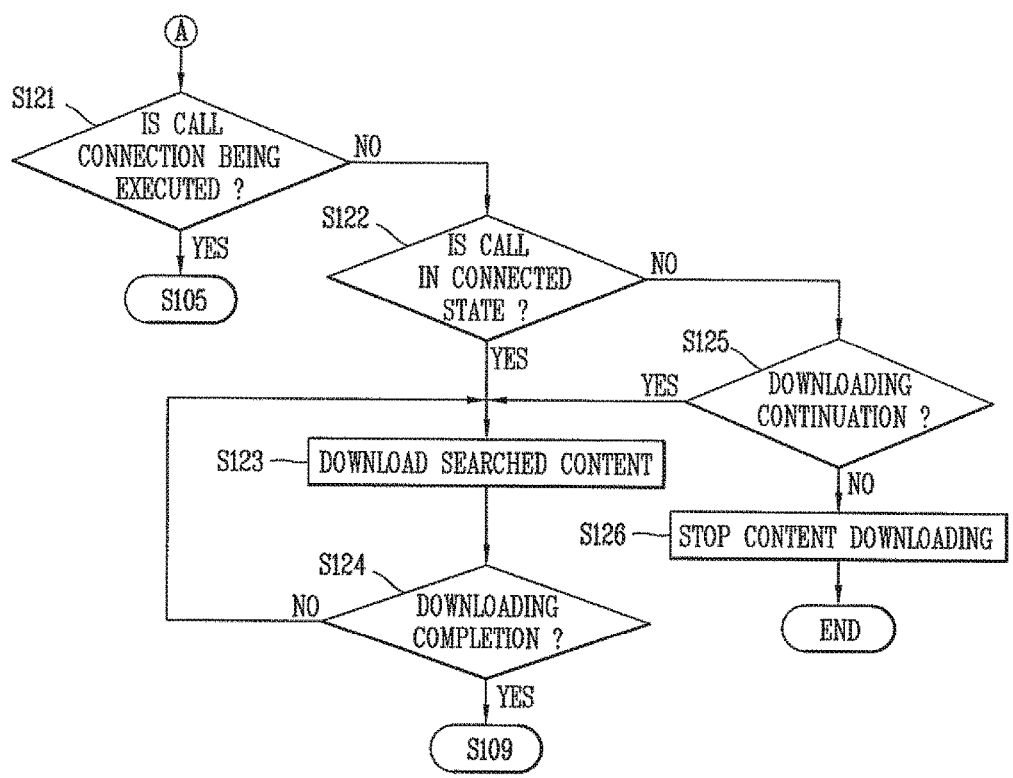

FIGS. 5A and 5B are flowcharts showing an incoming screen display method of a mobile terminal according to one embodiment of the present invention.

The wireless communication unit 110 of the receiving terminal receives a call signal generated from the transmitting terminal (S101). That is, the receiving terminal receives a call from the transmitting terminal. The wireless communication unit 110 transmits the received call signal to the controller 180.

Upon receiving the call signal, the controller 180 of the receiving terminal checks whether a communication service interworking has been established (S102). That is, the controller 180 checks whether the receiving terminal has been established to display an incoming screen by interworking with a community service.

Upon receiving the call signal, the controller 180 outputs information about the sender and alerts (vibration, bell, lamp, silence, etc.) preset by a user. Here, the controller 180 of the receiving terminal may output an alert (e.g., call signal reception sound) informing an incoming call, and display the sender's phone number and name on the display. For instance, in a state that music pre-stored in the memory 160 has been set as an incoming sound, if a call signal is received, the controller 180 controls the multimedia module 181 thereby to reproduce corresponding music. Then, the controller 180 outputs the reproduced music to the outside through the audio output module 152. And, the controller 180 searches a phone number matching the sender's phone number included in the call signal, from a contact list, and displays, on the display 151, the sender's name corresponding to the searched phone number together with the sender's phone number.

In a case that the incoming screen is set as a community screen, the controller 180 connects to a preset community site (social networking website) through the wireless internet module 113 (S103). The receiving terminal undergoes an authentication process with respect to usage of the connected community site, by using the recipient (user)'s information stored in the memory 160, e.g., ID, password, phone number, authentication information, etc. That is, the receiving terminal logs in the community site by using an ID and a password pre-stored therein.

For instance, the controller 180 of the receiving terminal is connected to an address of a preset community site, and requests permission with respect to usage of a service from the community site. When requesting the permission, the controller 180 transmits the request message to a community server together with the recipient's ID, password, etc. The community server checks whether the recipient has been subscribed to the connected community site based on the received ID and password. If the recipient is determined as a subscriber as a result of the check, the community server allows a service provided from the community site.

If the receiving terminal is connected to the recipient's community site, the controller 180 of the receiving terminal requests, from the community server, search for content written by the sender among contents registered to the recipient's community site, based on the sender's information (e.g., name, phone number, e-mail address, ID registered to the community server, etc.) (S104). The content (posting) includes photos, moving images, music, post message, tag messages, etc. In the present invention, it is assumed that the receiving terminal requests content search after a connection to the community site has been requested. However, the receiving terminal may simultaneously request content search when requesting a connection to the community site. When requesting content search, the receiving terminal may provide a filtering method for extracting a specific type of content from the entire contents. For instance, the receiving terminal may request search for only photos among the entire contents posted by the sender, according to the recipient's input.

According to the receiving terminal's request, the community server searches for the sender's content among the entire contents registered to the recipient's community site. Upon completion of the search, the community server transmits one or more searched contents to the receiving terminal. According to the receiving terminal's request, the community server searches for content written within a predetermined period or new content, among the sender's contents.

The wireless Internet module 113 of the receiving terminal receives the transmitted content (S105). That is, the receiving terminal starts to download the searched content. Here, the controller 180 of the receiving terminal also displays, on the display, a download progress of the content and a type of the connected community site.

Upon downloading the searched content, the controller 180 checks whether the content has been completely downloaded (S106).

If the content has been completely downloaded, the controller 180 checks whether a call connection is being executed (S107). That is, the controller 180 of the receiving terminal checks whether a call establishment for forming a voice path is being executed.

For instance, while outputting a call signal reception sound, the controller 180 of the receiving terminal waits until a response to an incoming call (e.g., approval, rejection, automatic answer, etc.) is input to the user input unit 130.

If the recipient presses a call key of the user input unit 130, the controller 180 recognizes a signal inputted from the user input unit 130 as a call approval command, thereby forming a voice path. Alternatively, if the recipient presses an 'END' key of the user input unit 130, the controller 180 recognizes a signal inputted from the user input unit 130 as a call rejection command, thereby disconnecting the connected call.

If it is determined in S107 that a call connection is being executed, the controller 180 displays the downloaded content on the display (S108). For instance, the controller 180 of the receiving terminal outputs a call signal reception sound, and at the same time, displays the downloaded content on the display set as an incoming screen. That is, the incoming screen includes the sender's phone number, the sender's name, the downloaded content, etc. When displaying the downloaded content, the receiving terminal may alignment the downloaded content according to a written date, a type of the downloaded content, etc.

If it is determined in S107 that a call connection is not being executed, the controller 180 outputs alerts (bell, vibration, silence, lamp, etc.) informing that the searched content has been completely downloaded (S109). Here, the state that a call connection is not being executed indicates either a call establishment state that a call has been connected (busy line state), or a call release state that a call connection has been ended (call ending, missed call, call rejection).

The controller 180 may display or may not display the downloaded content according to the recipient's response to the alert informing that the content has been completely downloaded (S110). For instance, if the searched content transmitted from the community server has been completely downloaded, the controller 180 outputs a message informing that the content has been completely downloaded, a message window inquiring whether to check the downloaded content, and an alert sound. If an 'OK' key is input as a response to the inquiry, the controller 180 displays the downloaded content on the display.

If it is determined in S102 that the community service interworking has been released, the controller 180 executes a call connection according to the aforementioned call establishment procedures (S112).

If it is determined in S106 that the searched content is being downloaded from the community server, the controller 180 checks that a call connection is being executed (S121). If it is determined that a call connection is being executed, the controller 180 continues to download the searched content (S105).

If it is determined in S121 that a call connection is not being executed, the controller 180 checks whether a call is in a connected state (S122). If a call is in a connected state, the controller 180 continues to download the searched content (S123).

If the content has been completely downloaded, the controller 180 returns to S109 and informs about the download completion of the content. And, the controller 180 displays the downloaded content on the display according to the recipient's request.

If it is determined in S122 that a call is not in a connected state, the controller 180 displays, on the display, an inquiry inquiring whether to continue to download the content (S125). If the recipient's response to the inquiry is inputted, the controller 180 continues to download the content (S123), or stops downloading the content (S126) according to the response.

Figure 6A:
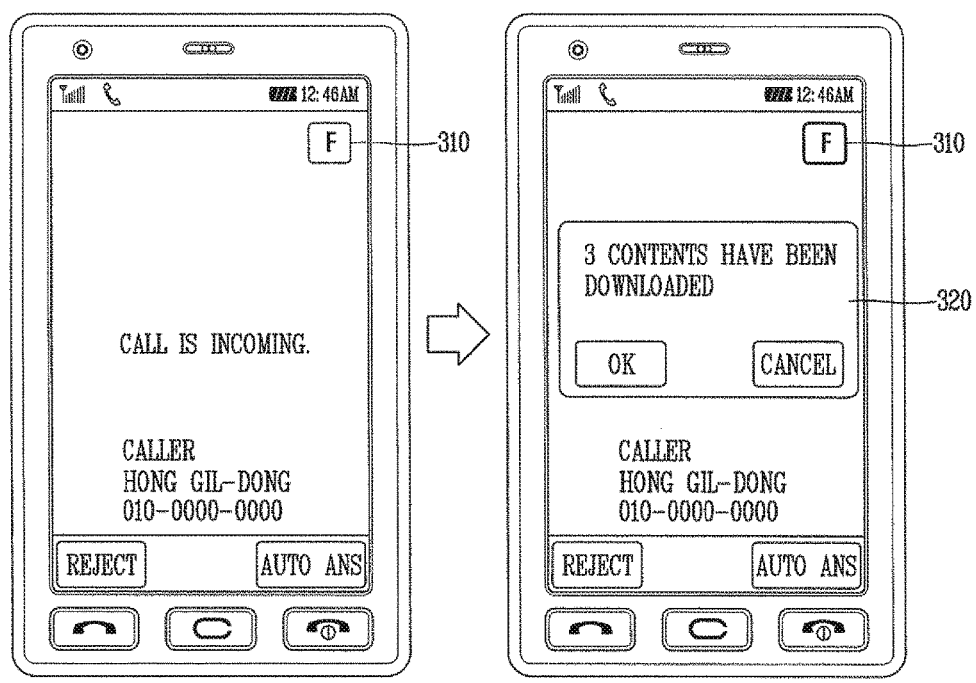
FIGS. 6A and 6B are examples of a screen of a mobile terminal according to one embodiment of the present invention, which show a method for downloading and displaying content of a community site when alerting a call signal reception.
Figure 6B:
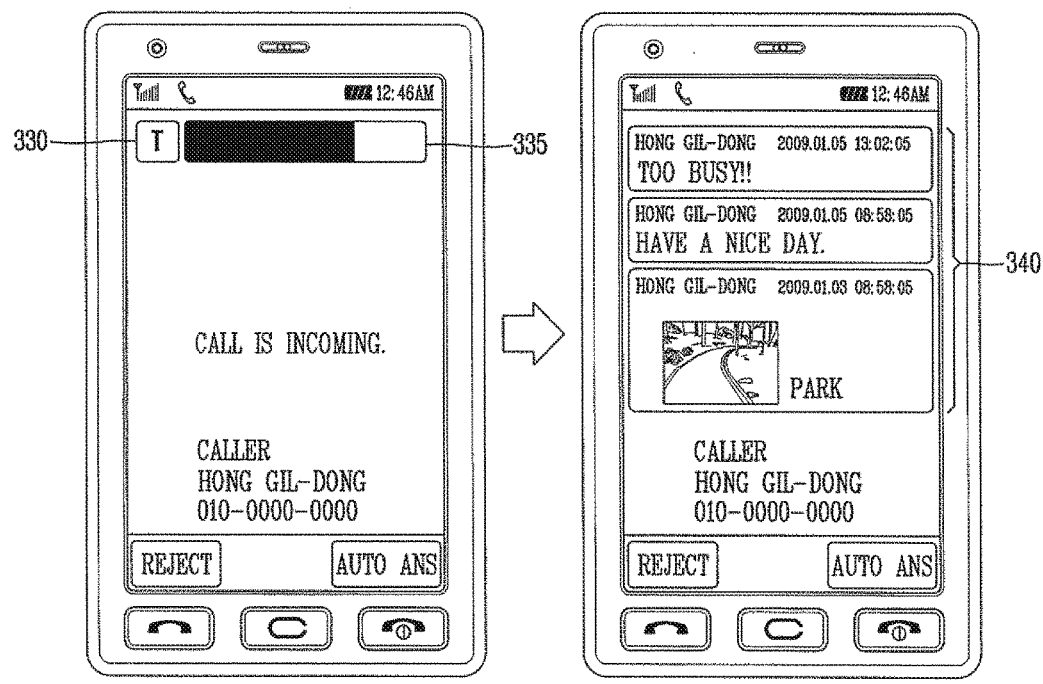

FIGS. 6A and 6B are examples of a screen of the mobile terminal according to one embodiment of the present invention, which show a method for downloading and displaying content of a community site when alerting a call signal reception.

As shown in FIG. 6A, when receiving a call signal through the wireless communication unit 110, the controller 180 of the mobile terminal 100 outputs an alert informing the call signal reception. For instance, the controller 180 displays, on the display, an incoming screen including a message informing a call signal reception, a sender's name, and a sender's phone number. Here, the controller 180 may identify the sender's name by extracting the sender's name included in the call signal, or by searching for a call party having a phone number matching the sender's phone number from a phone directory.

Upon receiving the call signal, the controller 180 checks whether a community service interworking has been established. If a community service interworking has been established, the controller 180 connects to the user (recipient)'s preset community site, and searches one or more contents written by the sender thus to download the content(s).

That is, the controller 180 connects to a server which provides a community service (hereinafter, referred to as 'community server'), and requests search for the sender's content from the community server. When requesting search for the sender's content, the controller 180 of the mobile terminal 100 also provides information about the sender to the community server.

The community server searches for the sender's content requested by the mobile terminal 100, and transmits the searched content to the mobile terminal 100. Here, if the sender's content has not been searched, the community server transmits, to the mobile terminal 100, a message informing that the sender's content has not been searched.

The controller 180 of the mobile terminal displays a download progress of the searched content on the display. Here, the controller 180 displays, on the display, an indicator 310 such as an image or a logo indicating a connected community site. According to the download progress of the searched content, the controller 180 changes a color, a darkness, a brightness, etc. of the indicator 310 so that the user can check the download progress of the searched content. Alternatively, the controller 180 may display an additional download progress bar.

Upon completion of the downloading of the searched content, the controller 180 displays, on the display 151, a pop-up window 320 including an inquiry inquiring whether to check the downloaded content, together with a message informing that the content has been completely downloaded. According to the recipient's response to the inquiry, the controller 180 displays the downloaded content on the display. For instance, in a case that the user touches an 'OK' key as a response to the inquiry inquiring whether to check the downloaded content, the controller 180 recognizes the touch as a positive answer, thus to display the downloaded content on the display.

Referring to FIG. 6B, upon reception of a call signal, the controller 180 outputs alerts (bell, vibration, silence, lamp) informing the call signal reception together with information (alert message, the sender's name, the sender's phone number, etc.). And, the controller 180 checks whether a community service interworking has been established. If a community service interworking has been established, the controller 180 connects to the user (recipient)'s preset community site, and receives the sender's content. That is, the controller 180 of the mobile terminal 100 is connected to the community server, and requests search for the sender's content. The community server searches for the sender's content, and transmits the sender's content to the mobile terminal 100 after completing the search. The controller 180 downloads said one or more searched content transmitted from the community server. Here, the controller 180 displays, on the display, an indicator 330 indicating a connected community site and a progress bar 335 indicating a download progress of the searched content.

Upon completion of the content downloading, the controller 180 displays the downloaded content 340 on the display.

The sender's content includes content registered by the sender within a predetermined time, recent content, new content, content having not been read by the user, etc.

If the user selects specific content among contents displayed on the display, the receiving terminal may scrap (upload, retweet) the selected content on the recipient's community site.

Figure 7A:
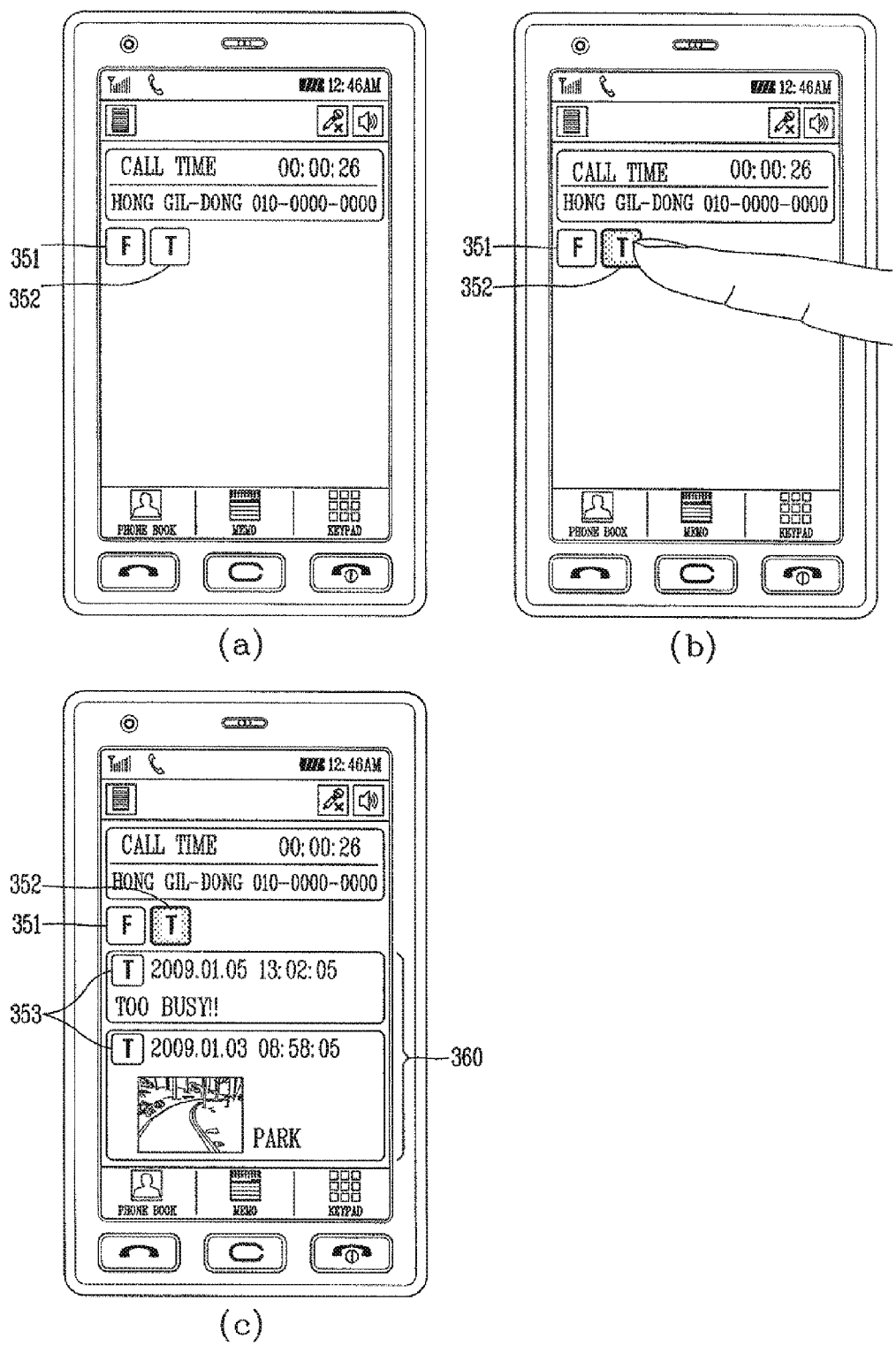

FIGS. 7A and 7B are examples of a screen of a mobile terminal according to one embodiment of the present invention, which show a method for downloading and displaying community information during a call.

If the recipient inputs a call key while one or more preset community sites are connected, the sender's content registered to the connected site is downloaded, and an alert informing a call signal reception is outputted, the controller 180 forms a voice path and performs conversations between the receiving terminal and the transmitting terminal.

Upon starting the call, the controller 180 converts the incoming screen displayed on the display 151 into a call screen (a). The call screen includes counted call time, an indicator indicating a download progress of one or more contents distinguished from each other according to each community site, etc.

If the content downloading has been completed during the call, the controller 180 displays an indicator 351 and/or an indicator 352 indicating a community site which has provided the completely downloaded content in a flicking manner (b). That is, the mobile terminal 100 outputs an alert so that the user can recognize the completion of the content downloading with using one or more senses among his or her five senses.

If the indicator 352 indicating the complete downloading of the content provided from the community site is selected from the indicators 351, 352 displayed on the call screen, the controller 180 displays, on the display, the sender's content 360 provided from the corresponding community site (c). Here, the controller 180 displays the sender's content 360, together with an indicator 353 indicating a community site which has provided the sender's content 360.

Referring to FIG. 7B, if the sender's content requested to the community server has been completely downloaded during the call, the controller 180 outputs an alarm sound informing the completion of the downloading. If the call is ended after outputting the alarm sound, the controller 180 displays downloaded content 365 on the display. Here, the controller 180 displays the downloaded content 365 together with a call time. If the user selects one or more contents from the contents displayed on the display, the selected content(s) may be stored in the mobile terminal. For instance, if an image is selected from the content displayed on the display, the mobile terminal may store the selected image therein and set the stored image as a background screen of the display.

Figure 8A:
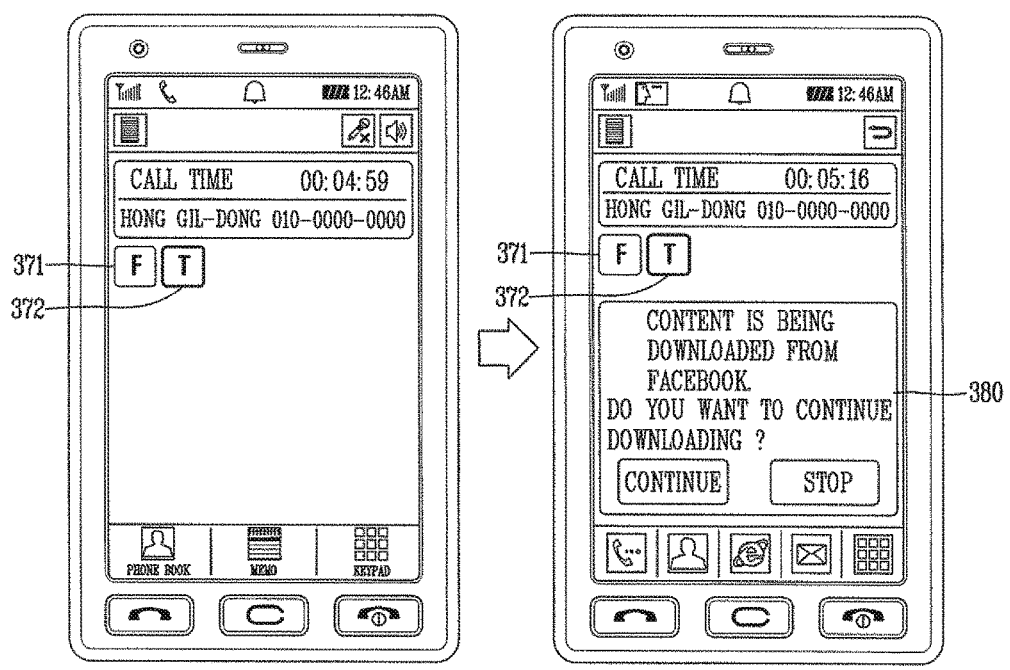
FIGS. 8A to 8C are examples of a screen of a mobile terminal according to one embodiment of the present invention, which show a method for displaying community information when releasing a call.
Figure 8B:
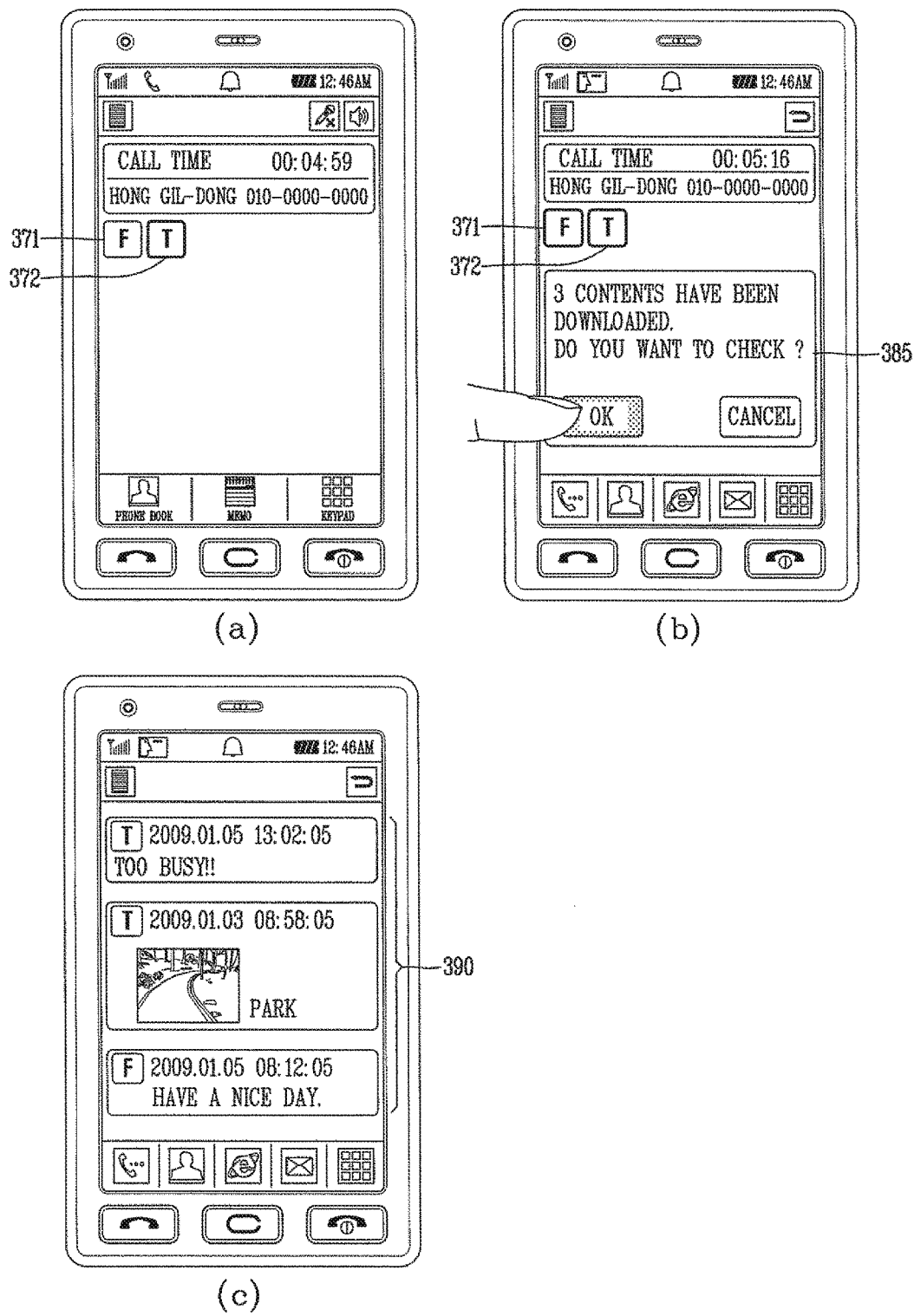
Figure 8C:
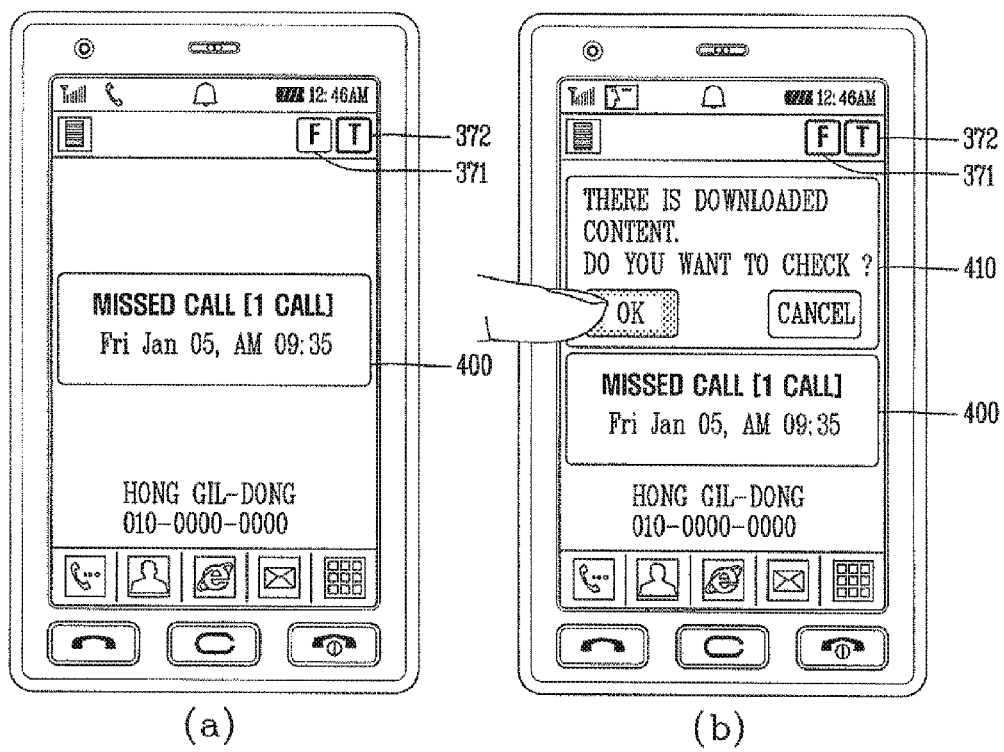
Figure 8C:
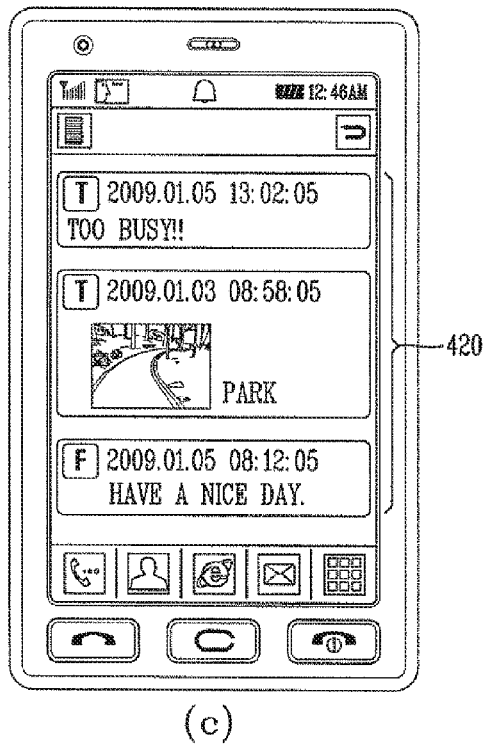

FIGS. 8A to 8C are examples of a screen of a mobile terminal according to one embodiment of the present invention, which show a method for displaying community information when releasing a call.

Referring to FIG. 8A, while a call is performed between the receiving terminal and the transmitting terminal, the controller 180 downloads the sender's content from the community server. And, the controller 180 displays a download progress of the sender's content on the display. For instance, the incoming screen of the receiving terminal includes a call time, the sender's name and phone number, indicators 371 and 372 according to each community site, etc.

If the recipient inputs an 'END' key under a state that the sender's content has not been completely downloaded, the controller 180 releases the voice path (call connection) formed between the receiving terminal and the transmitting terminal. And, the controller 180 displays a pop-up window 380 inquiring whether to continue the content downloading. If the user selects a 'CONTINUE' key as a response to the inquiry, the controller 180 continues to download the content. On the other hand, if the user selects a 'STOP' key as a response to the inquiry, the controller 180 stops the downloading being currently performed, and deletes the content having been downloaded so far from the memory 160.

Referring to FIG. 8B, the controller 180 displays a call screen on the display while performing a call (a). The call screen includes a call time, the sender's name and phone number, indicators 371 and 372 indicating that content is being downloaded from community sites.

Upon completion of the call, the controller 180 displays a counted call time, together with an inquiry 385 inquiring whether to check the sender's completely downloaded content (b). If the user inputs an 'OK' key in response to the inquiry, the controller 180 displays the downloaded content 390 on the display (c).

Referring to FIG. 8C, the receiving terminal outputs an alert informing a call signal reception, and displays a message 400 informing a missed call on the display if there is no response to the alert within a predetermined time (a). Then, the controller 180 checks whether the content being downloaded has been completely downloaded.

If the sender's content has not been completely downloaded, the controller 180 displays an inquiry 410 inquiring whether to continue the downloading of the sender's content (b). According to a response to the inquiry, the controller continues to download the sender's content, or stops the downloading.

If a voice path has not been formed due to a missed call in the completely downloaded state, the controller 180 displays the downloaded content 420 on the display (c).

Figure 9:
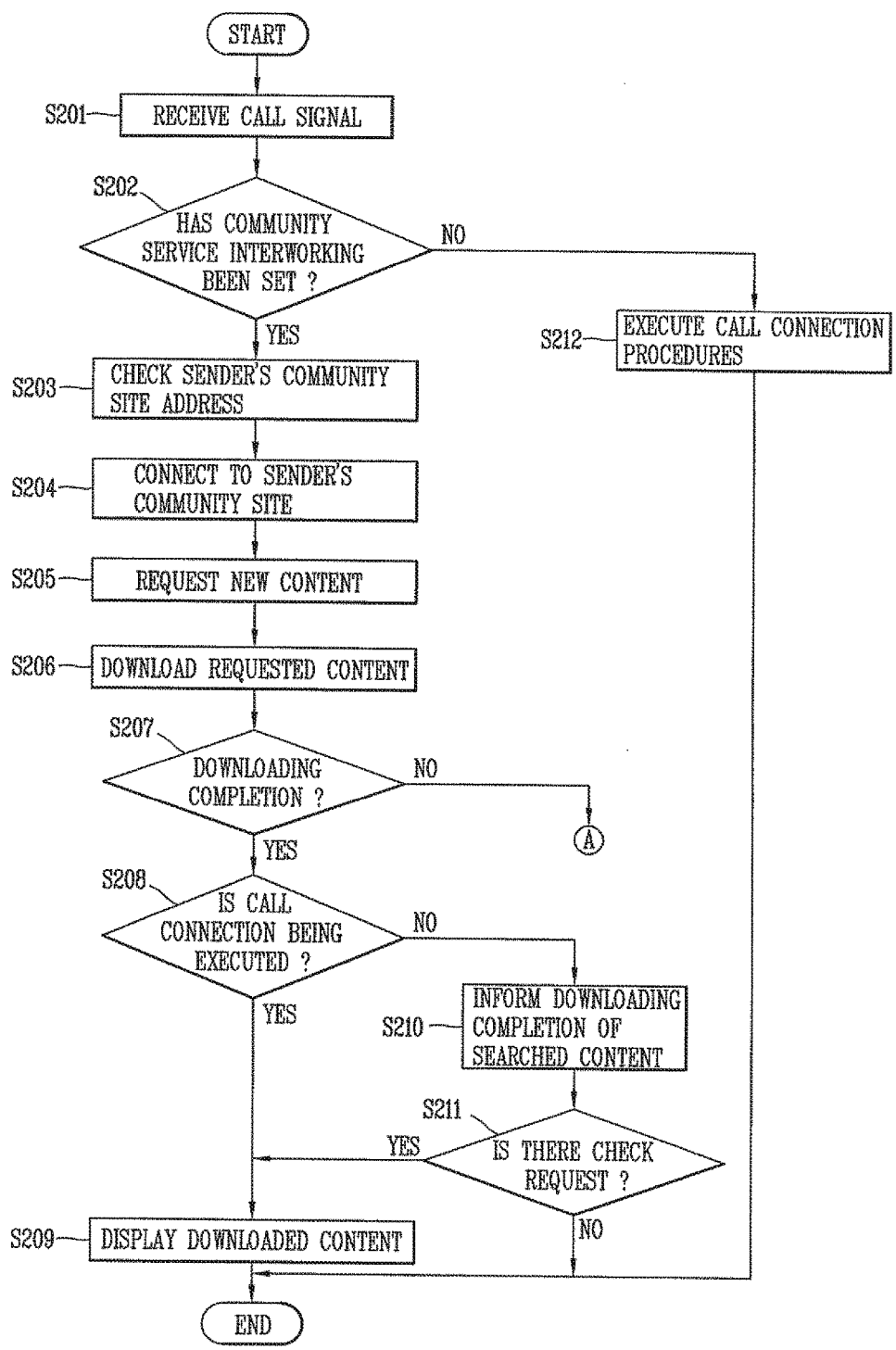
FIG. 9 is a flowchart showing an incoming screen display method of a mobile terminal according to another embodiment of the present invention.

FIG. 9 is a flowchart showing an incoming screen display method of a mobile terminal according to another embodiment of the present invention.

With reference to FIGS. 9 and 5B, will be explained a method for downloading and displaying content by connecting to the sender's community site when receiving a call signal.

The receiving terminal receives a call signal through the wireless communication unit 110 (S201). The wireless communication unit 110 transmits the received call signal to the controller 180.

The controller 180 having received the call signal checks whether a community service interworking has been established (S202). If a community service interworking has been established as a result of the checking, the controller 180 searches a call party having a phone number matching the sender's phone number, from a contact list, and checks an address of the call party (sender)'s community site (S203). Here, the controller 180 checks whether the recipient also uses the sender's community site. Then, the controller 180 connects to the checked sender's community site by driving the wireless internet module 113 (S204).

Upon connection to the sender's community site, the controller 180 requests new content registered to the sender's community site (S205). According to the request, the community server checks whether there is new content among contents registered to the sender's community site. If there are one or more new contents, the community server transmits the new contents to the receiving terminal. Here, the community server may transmit only content(s) having not been checked by the recipient among the new contents.

The controller 180 of the receiving terminal receives the new content transmitted from the community server (S206). That is, the receiving terminal downloads one or more new contents from the community server. If the receiving terminal receives, from the community server, a message indicating there is no new content, the controller 180 displays the received message on the display.

The controller 180 checks a download progress of the content from the community server (S207). Here, the controller 180 displays, on the display 151, a progress bar indicating a download progress of the content.

If the content has been completely downloaded in S207, the controller 180 checks whether a call establishment is being executed (S208). That is, the controller 180 checks whether a call connection is being attempted in a state that a voice path has not been formed.

If it is checked that a call establishment is being executed, the controller 180 displays the downloaded content on the display (S209) Here, the controller 180 may display content according to each community site, or display content in an alignment manner according to each registration time.

If it is checked in S208 that a call establishment is not being executed, the controller 180 outputs alerts (bell, vibration, silence, lamp, etc.) informing that the searched content has been completely downloaded (S210). Here, the state that a call connection is not being executed includes either a call establishment state that a call has been connected (busy line state), or a call release state that a call connection has been ended (call ending, missed call, call rejection).

The controller 180 may display or may not display the downloaded content according to the recipient's response to the alert informing that the content has been completely downloaded (S211). For instance, if the searched content transmitted from the community server has been completely downloaded, the controller 180 outputs a message informing that the content has been completely downloaded, a message window inquiring whether to check the downloaded content, and an alert sound. If an 'OK' key is input as a response to the inquiry, the controller 180 displays the downloaded content on the display.

If it is determined in S202 that the community service interworking has been released, the controller 180 executes a call connection according to the aforementioned call establishment procedures (S212).

If it is determined in S207 that the searched content is being downloaded from the community server, the controller 180 checks that a call connection is being executed (S121). If it is determined that a call connection is being executed, the controller 180 continues to download the searched content (S105).

If it is determined in S121 that a call connection is not being executed, the controller 180 checks whether a call is in a connected state (S122). If a call is in a connected state, the controller 180 continues to download the searched content (S123).

If the content has been completely downloaded, the controller 180 returns to S109 and informs about the download completion of the content. And, the controller 180 displays the downloaded content on the display according to the recipient's request.

If it is determined in S122 that a call is not connected, the controller 180 displays, on the display, an inquiry inquiring whether to continue to download the content (S125). If the recipient's response to the inquiry is inputted, the controller 180 continues to download the content (S123), or stops downloading the content (S126) according to the response.

Figure 10:
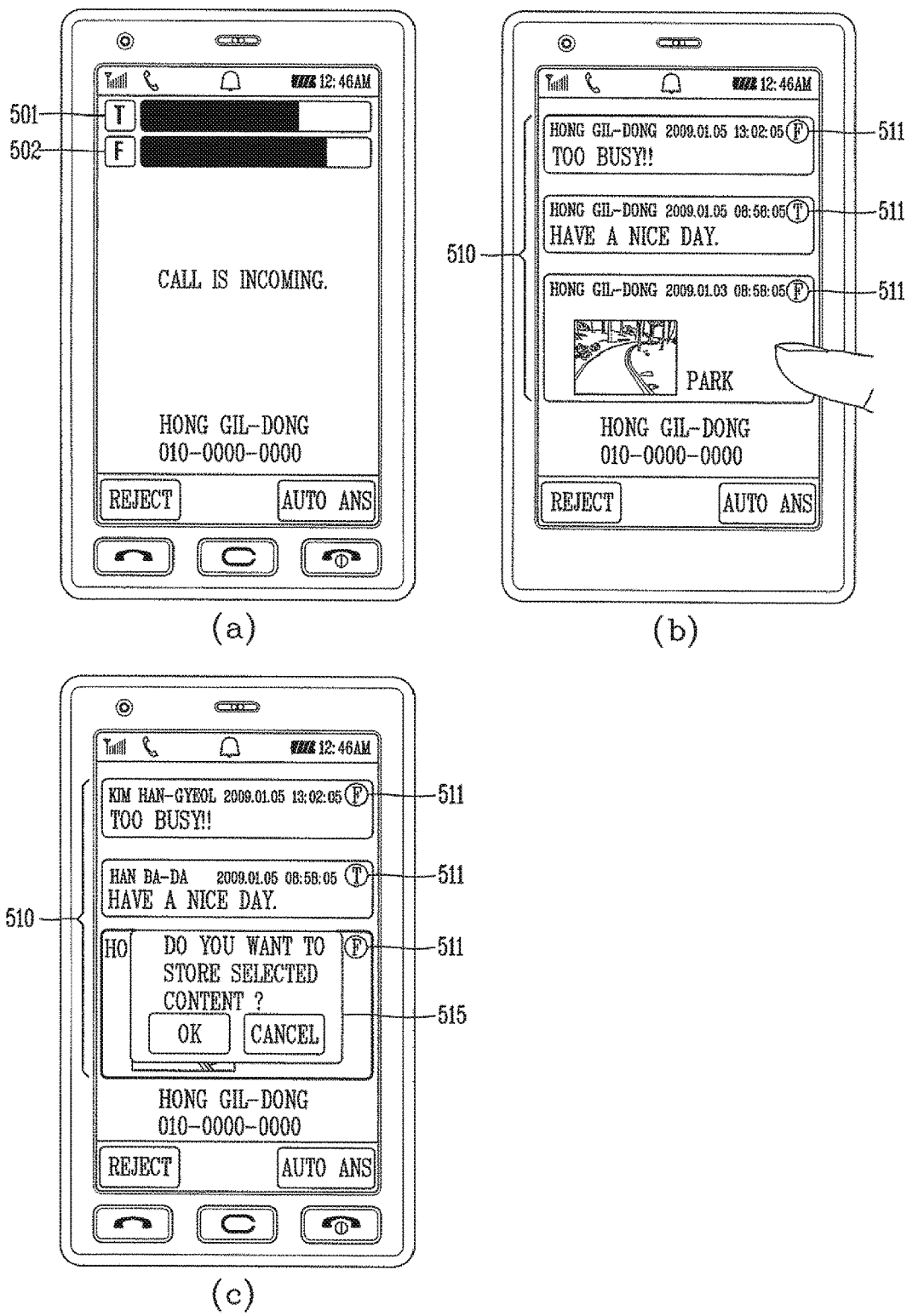
FIG. 10 shows examples of an incoming screen of a mobile terminal according to another embodiment of the present invention.

FIG. 10 shows examples of an incoming screen of a mobile terminal according to another embodiment of the present invention.

If the mobile terminal 100 receives a call signal through the wireless communication unit 110, the controller 180 notifies the call signal reception. For instance, if the mobile terminal 100 receives a call signal through the wireless communication unit 110, the controller 180 outputs a preset incoming screen and a preset incoming bell (a). Here, the controller 180 extracts information about the sender (e.g., name and/or phone number) from the received call signal, and displays the information on the incoming screen.

Upon receipt of the call signal, the controller 180 checks, from a phone book, an address of the sender's community site by using the sender's information. If the controller 180 has failed in checking the address of the sender's community site, a message indicating that "OOO has no community information" is displayed.

Upon checking the address of the sender's community site, the controller 180 connects to the sender's community site through the wireless internet module 113. And, the controller 180 downloads new content among contents registered to the community site. That is, the controller 180 requests new content from the community server. Then, the community server searches for recent new content among the contents registered to the community site according to the request by the mobile terminal 100, and then transmits the searched content to the mobile terminal 100. For instance, the community server searches for content written within three days based on the current date, and then transmits the searched content to the mobile terminal 100.

Here, the controller 180 displays, on the incoming screen, a download progress of the content provided from the community server (a). For instance, in a case that the sender's community site is formed in plurality in number, the controller 180 displays progress bars 501 and 502 indicating a download progress of each content according to each community site. Here, the controller 180 displays the progress bars 501 and 502, together with community site logos corresponding to the progress bars 501 and 502.

If the downloading of the content has been completed during a call connection, the controller 180 displays the downloaded content 510 on the incoming screen (b). The controller 180 displays each of the content 510 with an indicator 511 indicating a source of the corresponding content 510. The indicator 511 may be a logo or an initial of a corresponding community site, etc.

If one of the plurality of contents 510 displayed on the display set as the incoming screen is selected, the controller 180 displays, on the incoming screen, a pop-up window 515 inquiring whether to store the selected content (c). The controller 180 waits for the user's response to the inquiry, and determines whether to store the selected content if the user's response has been input. For instance, if the user has approved to store the selected content, the controller 180 stores the selected content in the memory 160. On the other hand, if the user has refused to store the selected content, the controller 180 does not store the selected content in the memory 160.

Figure 11:
FIG. 11 shows a message reception screen of a mobile terminal according to another embodiment of the present invention.
Figure 11:
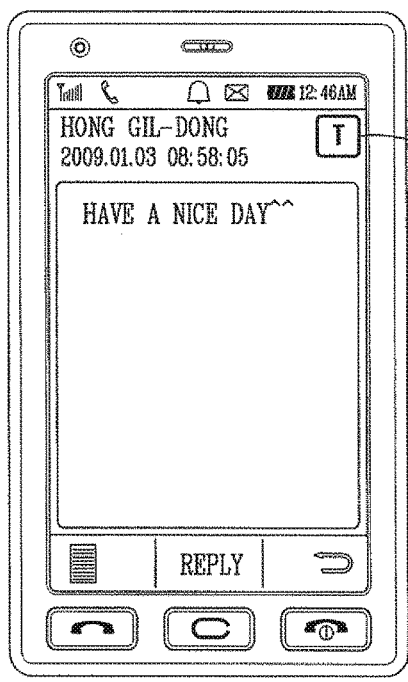
Figure 11:
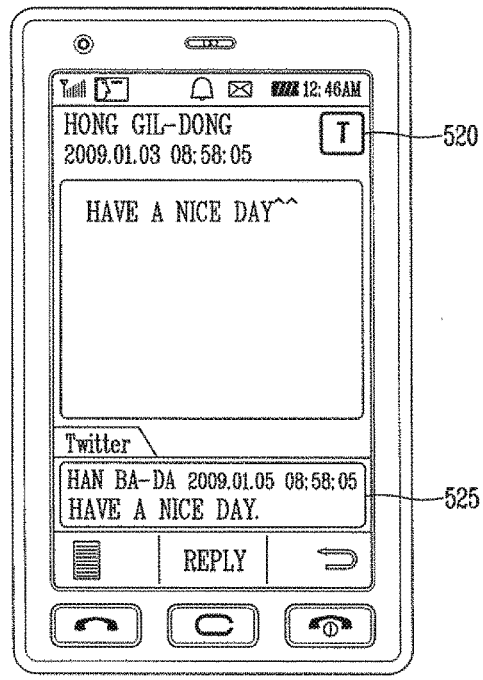

FIG. 11 shows a message reception screen of a mobile terminal according to another embodiment of the present invention.

Firstly, the controller 180 of the mobile terminal 100 receives a message through the wireless communication unit 110. Upon receipt of the message, the controller 180 outputs a message and an effect sound, each informing message reception. Here, the controller 180 checks, from a phone book, an address of the sender's community site with using the sender's information included in the received message.

Upon checking the address of the sender's community site, the controller 180 connects to the corresponding community site by driving the wireless internet module 113. And, the controller 180 requests new content registered to the connected community site.

According to the request by the mobile terminal 100, the community server searches for recent content written within one week, among contents registered to the sender's community site. Then, the community server transmits the searched content to the mobile terminal 100.

The mobile terminal 100 downloads the content transmitted from the community server through the wireless internet module 113. And, the controller 180 of the mobile terminal 100 displays, on a message reception screen, a message informing that content (e.g., twitter content) is being downloaded from the community server (a).

If the user touches an 'OK' key approving the message check on the message reception screen, the controller 180 recognizes the touch input as a message display command, thereby displaying the received message on the display (b). Also, the controller 180 displays an indicator 520 indicating a connected community site, and changes a color, a brightness, a darkness of the indicator 520 according to a download progress of the content.

If the content has been completely downloaded, the controller 180 displays the downloaded content 525 on the display (c).

Figure 12:
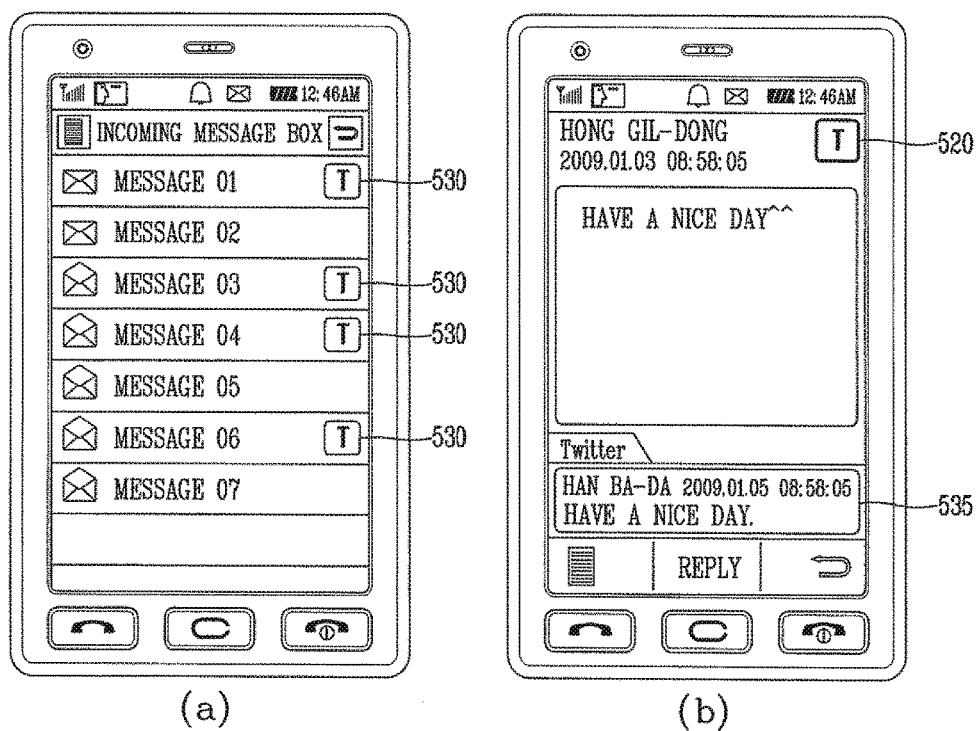
FIG. 12 shows a screen showing a list of received message of a mobile terminal according to another embodiment of the present invention.

FIG. 12 shows a screen showing a list of received messages of a mobile terminal according to another embodiment of the present invention.

Referring to FIG. 12, if an incoming message box is selected by the user's menu manipulation, the controller 180 of the mobile terminal 100 displays a list of received messages (a). When receiving a message, the controller 180 downloads content registered to the sender's community site by interworking with a community service. And, the controller 180 displays the received message, together with an icon 530 indicating the downloaded content.

If one message is selected from the list of received messages, the controller 180 displays the selected message on the display. When the received message includes downloaded content 535, the controller 180 displays, on the display, the received message together with the downloaded content 535.

Figure 13:
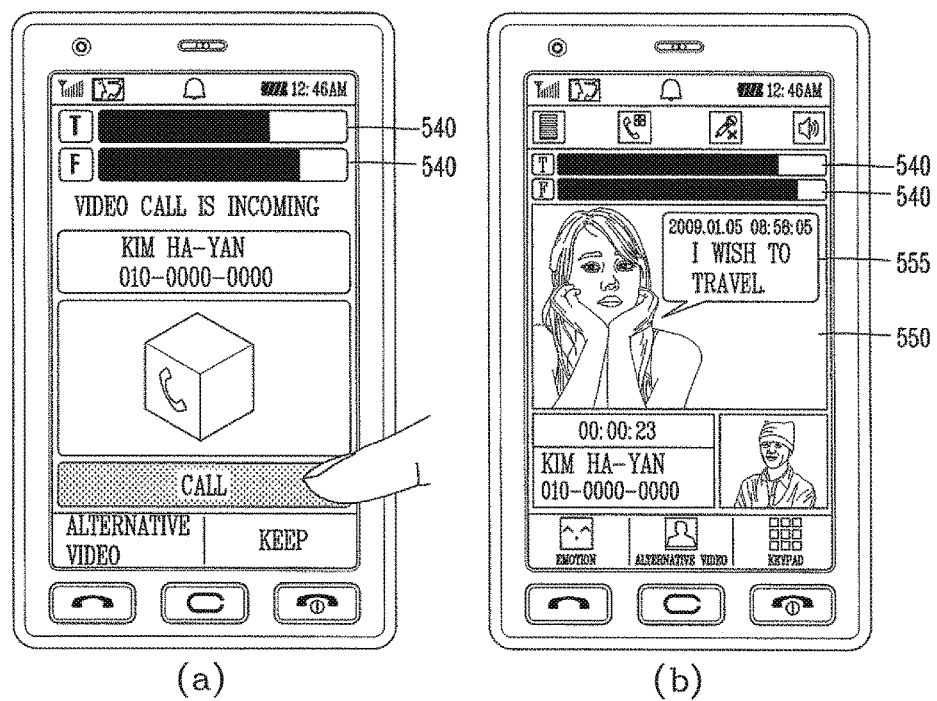
FIG. 13 is an example showing a video call screen of the mobile terminal according to the present invention.

FIG. 13 is an example showing a video call screen of the mobile terminal according to the present invention.

When the mobile terminal 100 receives a video call signal through the wireless communication unit 110, the controller 180 informs the video call signal reception (a). For instance, if a video call signal is received, the controller 180 outputs a preset incoming screen and incoming sound with respect to the video call signal.

The controller 180 checks whether a community service interworking has been established. If a community service interworking has been established, the controller 180 connects to the user (recipient)'s preset community site. And, the controller 180 downloads the sender's one or more contents among contents registered to the connected community site. The controller 180 starts to download the content, and at the same time, displays a progress bar 54 indicating a download progress of the content on the display.

Next, if the user's response to the outputted incoming screen and incoming sound is input by the user input unit 130, the controller 180 makes a video call connection or releases the connected video call according to the response.

If an 'OK' key for the video call connection is input through the user input unit 130, a video call is connected.

If the downloading of the content has been completed after the video call connection, the controller 180 displays the content on a display region 550 where the sender's image is displayed, in the form of a balloon 555.

If the displayed content is selected, the controller 180 of the receiving terminal may transmit the selected content to other terminal.

In the present invention, it is assumed that the receiving terminal receives a call signal. However, the transmitting terminal may download content written by the recipient by connecting to the sender or recipient's community site, and display the downloaded content on the display.

The mobile terminal according to one or more preferred embodiments of the present invention may download content registered by the sender by connecting to the recipient's preset network site when receiving a call signal, and display the downloaded content.

Furthermore, the mobile terminal according to the present invention may download content registered to the sender's network site when receiving a call signal, and display the downloaded content.

The aforementioned method may be implemented as a program code stored in a computer-readable storage medium. The storage medium may include ROM, RAM, CD-ROM, a magnetic tape, a floppy disc, an optical data storage device, etc. And, the storage medium may be implemented as carrier wave (transmission through the Internet). The computer may include the controller 180 of the mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. An incoming screen display method of a mobile terminal, the method comprising:
receiving a call request from a transmitting terminal;

connecting to a plurality of social network servers based on the receiving of the call request;
connecting the call between two mobile terminals;
requesting search for content registered by a sender to the plurality of social network servers while the call is connected;
downloading the searched content from the plurality of social network servers;
displaying, on a screen, a call screen representing performing of the call and a plurality of indicators corresponding to the plurality of social network servers while the searched content is downloading;
receiving a touch input applied at a specific indicator corresponding to a specific social network server, from among the plurality of indicators; and
in response to receiving the touch input, displaying, on the screen, at least one content from among the searched content, wherein the at least one content is downloaded from the specific social network server.

2. The method of claim 1, wherein in the connecting to the plurality of social network servers, the mobile terminal is connected to the plurality of social network servers through an authentication process using a recipient's information pre-stored in the mobile terminal.

3. The method of claim 2, wherein the recipient's information includes a user's ID and password, or a user's phone number.

4. The method of claim 1, wherein in the connecting to the plurality of social network servers, the mobile terminal is connected to a plurality of social network sites preset by a user.

5. The method of claim 1, wherein the content comprises one of posting message, tag messages, music, photos, still images, and moving images.

6. The method of claim 1, wherein the requesting of the search for content comprises:
extracting the sender's phone number included in the call request;
searching for the extracted sender's phone number from a phone directory; and
transmitting identification information of a call party matching the sender's phone number, with including in the message requesting for the content search.

7. The method of claim 6, wherein the identification information comprises one of a name, an e-mail address, and an ID registered to the community server.

8. The method of claim 1, wherein the downloading of the searched content comprises:
searching for the sender's content by the plurality of social network servers according to the search request; and
transmitting the searched content to the mobile terminal by the plurality of social network servers.

9. The method of claim 1, wherein displaying of the downloaded content comprises:
checking whether a call connection has been completed if the searched content has been downloaded;
outputting an alert informing the completion of the content downloading if the call connection has been completed; and
displaying the downloaded content if a positive response to the alert has been input.

10. The method of claim 9, further comprising displaying the downloaded content when the call connection has not been completed.

11. The method of claim 1, further comprising:
inquiring whether to maintain the content downloading if the call connection has failed or has been released while downloading the searched content; and
maintaining or stopping the content downloading according to a response to the inquiry.

12. A mobile terminal, comprising:
a communication unit configured to perform a communication with a transmitting terminal and/or a community server; and
a controller configured to:
receive a call request from a transmitting terminal;
connect to a plurality of social network servers based on the receiving of the call request;
connect the call between two mobile terminals;
request search for content registered by a sender to the plurality of social network servers while the call is connected;
download the searched content from the plurality of social network servers;
display, on a screen, a call screen representing performing of the call and a plurality of indicators corresponding to the plurality of social network servers while the searched content is downloading;
receive a touch input applied at a specific indicator corresponding to a specific social network server, from among the plurality of indicators; and
in response to receiving the touch input, display, on the screen, at least one content from among the searched content, wherein the at least one content is downloaded from the specific social network server.

13. The mobile terminal of claim 12, wherein the controller connects to the plurality of social network servers preset by a user.

14. The mobile terminal of claim 13, wherein the content is content registered to the plurality of social network servers by the sender.

15. The mobile terminal of claim 12, wherein the controller searches a call party matching the sender's phone number from a phone directory, and connects to the plurality of social network servers.

16. The mobile terminal of claim 15, wherein the content is new content registered to the plurality of social network servers.

17. The mobile terminal of claim 12, wherein the controller displays the downloaded content on a display if a call connection is being executed.

18. The mobile terminal of claim 12, wherein the controller inquires whether to check the downloaded content if the call connection is being executed, and displays the downloaded content according to a response to the inquiry.

19. The mobile terminal of claim 12, wherein the controller inquires whether to continue the content downloading if the call connection has been stopped or released, and determines whether to continue the content downloading according to a response to the inquiry.

* * * * *